Nov. 16, 1926.  1,607,436
P. I. CHANDEYSSON
TERMINAL HOUSING
Filed July 14, 1923
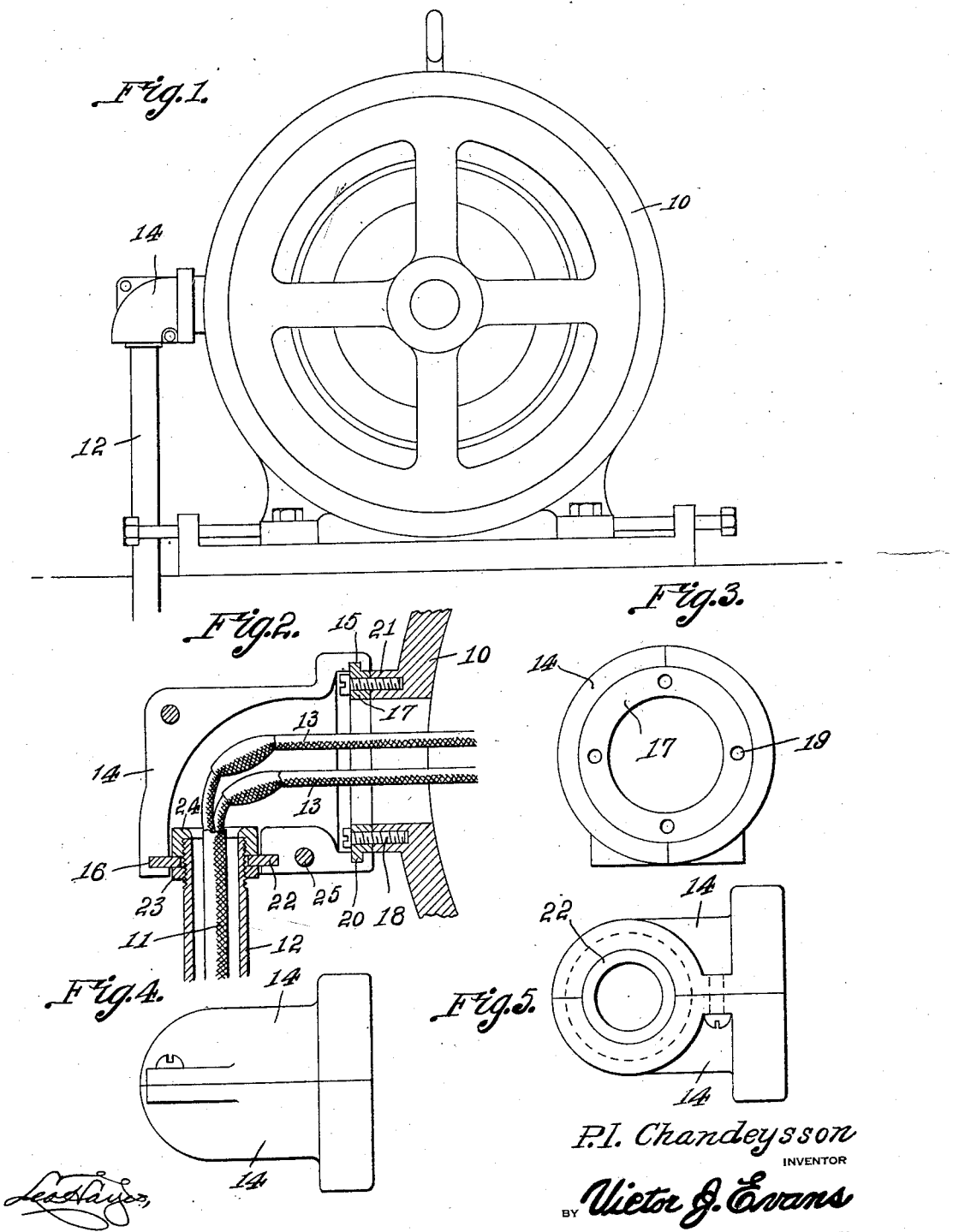

Patented Nov. 16, 1926.

1,607,436

UNITED STATES PATENT OFFICE.

PIERRE I. CHANDEYSSON, OF ST. LOUIS, MISSOURI.

TERMINAL HOUSING.

Application filed July 14, 1923. Serial No. 651,638.

This invention relates to improvements in terminal housings and has for an object the provision of means whereby connection between an electric motor, generator, or other device and an electric conduit, may be easily and quickly made.

Another object is the provision of a terminal housing, wherein electric connections may be first made and the housing then attached, so that the said housing will not interfere with the operation of connecting the conductors with the device.

Another object of the invention is the provision of a terminal housing which may be angularly adjusted so as to accommodate a conduit of any angle.

With the above and other objects in view, the invention further includes the following novel features and details of construction, to be hereinafter more fully described, illustrated in the accompanying drawings and pointed out in the appended claim.

In the drawings:—

Figure 1 is an elevation of an electric motor illustrating the application of the invention.

Figure 2 is an enlarged fragmentary sectional view showing the manner of connecting the frame of the motor and the wire conduit.

Figure 3 is an elevation looking at the motor end of the terminal housing.

Figure 4 is a top plan view of the same.

Figure 5 is a bottom plan view.

Referring in detail to the drawings, the reference character 10 indicates the frame of a motor which is used for the purpose of explaining the invention, while the conduit through which the conductor wires 11 are connected to the motor, is indicated at 12.

The invention which resides in the means of connecting the end of the conduit 12 with the motor frame 10, comprises a housing which encloses the connected ends of the conductors 11 and the terminals 13 of the motor, the construction of the housing being such as to permit of these sections being made and the housing afterward applied. For this purpose, the housing comprises a pair of complemental members 14 which are substantially semi-circular in cross section and curved so that when connected together, the members 14 form an elbow or coupling. Each of the members 14 is provided at opposite ends with transversely disposed grooves 15 and 16 and when the members 14 are associated, these grooves form annular seats. The grooves 15 provide seats for a ring 17, which is adapted to be secured to the motor housing 10 by machine screws or similar fastening devices 18 and for this purpose, the ring 17 is provided with openings 19. The ring 17 is preferably formed with a peripheral flange 20 which enters the seat provided by the grooves 15 and the outer face of the ring abuts the outer face of a flange 21, which extends from the motor housing 10. The end of the terminal housing is thus swiveled to the motor frame so that any angular adjustment of the housing may be obtained.

The seat formed by the grooves 16 of the members 14 is adapted to receive a ring 22, which is removably fitted upon the adjacent end of the conduit 12 and for this purpose, this ring is clamped between a flange or ring 23 of the conduit and a removable conduit bushing 24. The members 14 are removably clamped together by means of machine screws or similar fastening devices 25.

In the use of the invention, the connections between the motor terminals 13 and the conductors 11 are made after the rings 17 and 22 have been arranged, that is, after the ring 17 has been secured to the motor frame and the ring 20 clamped between the collar 23 and the bushing 24. Connection between the terminals 13 and the conductors 11 may thus be made without interference. After proper connection has been made, the members 14 of the terminal housing are then clamped in place with the rings 17 and 22 in their respective seats. As before stated, owing to the swivel connections, the terminal housing and consequently the conduit 12 may be adjusted to any desired angle.

The invention is susceptible of various changes in its form, proportions and minor details of construction and the right is herein reserved to make such changes as properly fall within the scope of the appended claim.

Having described the invention what is claimed is:—

A separable terminal housing forming a means of communication and radial adjustment between a conduit and motor housing comprising curved complemental members, each of said members provided with annular grooves disposed at right angles adjacent the ends thereof, a ring carried by the motor housing providing an annular flange received within one of the grooves, a disk carried by the conduit and correspondingly associated with the housing, and means for securing said complemental members together.

In testimony whereof I affix my signature.

PIERRE I. CHANDEYSSON.